US012454482B2

(12) United States Patent
Moncarz et al.

(10) Patent No.: US 12,454,482 B2
(45) Date of Patent: Oct. 28, 2025

(54) HIGH THERMAL COEFFICIENT GROUT COMPOSITIONS AND METHODS THEREFOR

(71) Applicant: XGS Energy, Inc., Palo Alto, CA (US)

(72) Inventors: Piotr D. Moncarz, Palo Alto, CA (US); Daniel Bour, Granite Falls, WA (US); Gerald Fuller, Palo Alto, CA (US); Axel-Pierre Bois, Curis-au-Mont-d'Or (FR); Poodipeddi V. Suryanarayana, Plano, TX (US); Mark McGilvray, Jr., Katy, TX (US)

(73) Assignee: XGS Energy Inc., Palo Alto, CA (US)

( * ) Notice: Subject to any disclaimer, the term of this patent is extended or adjusted under 35 U.S.C. 154(b) by 0 days.

(21) Appl. No.: 18/784,599

(22) Filed: Jul. 25, 2024

(65) Prior Publication Data

US 2024/0400445 A1  Dec. 5, 2024

Related U.S. Application Data

(63) Continuation of application No. PCT/US2023/061279, filed on Jan. 25, 2023.
(Continued)

(51) Int. Cl.
*C04B 7/02* (2006.01)
*C04B 7/32* (2006.01)
(Continued)

(52) U.S. Cl.
CPC ............ *C04B 7/02* (2013.01); *C04B 7/32* (2013.01); *E21B 33/13* (2013.01);
(Continued)

(58) Field of Classification Search
CPC ......... C04B 7/02; C04B 7/32; C04B 2103/20; C04B 2111/70; C04B 2201/32; E21B 33/13
See application file for complete search history.

(56) References Cited

U.S. PATENT DOCUMENTS 827,437 A   7/1906  Giles
860,772 A   7/1907  Taylor et al.
(Continued)

FOREIGN PATENT DOCUMENTS

CA    3230116 A1   3/2023
CN   106810181 A   6/2017
(Continued)

OTHER PUBLICATIONS

English machine translation of KR-101912467-B1 (Year: 2018).*
(Continued)

*Primary Examiner* — Amber R Orlando
*Assistant Examiner* — Jeffrey Eugene Barzach
(74) *Attorney, Agent, or Firm* — Martin Fessenmaier; Umberg Zipser LLP (57) ABSTRACT

A high-thermal conductivity grout composition is provided. The composition includes a grout mixture including a cementitious material, a retarder, and a high-thermal k material that advantageously can form a pumpable slurry upon admixture with water. The retarder is present in an amount effective that delays setting of the grout mixture at a target location having a geostatic target temperature of at least 300° F. for at least two hours. The high-thermal k material is present in an amount effective such that the grout mixture has, upon setting at the target location, a thermal conductivity of at least 1 W/m° K.

19 Claims, 2 Drawing Sheets

Related U.S. Application Data (60) Provisional application No. 63/305,599, filed on Feb. 1, 2022.

(51) Int. Cl.
  *C04B 103/20* (2006.01)
  *C04B 111/70* (2006.01)
  *E21B 33/13* (2006.01)

(52) U.S. Cl.
  CPC ....... *C04B 2103/20* (2013.01); *C04B 2111/70* (2013.01); *C04B 2201/32* (2013.01)

(56) References Cited

U.S. PATENT DOCUMENTS

| | | |
|---|---|---|
| 3,058,909 A | 10/1962 | Kern |
| 3,062,294 A | 11/1962 | Huitt et al. |
| 3,163,219 A | 12/1964 | Wyant et al. |
| 4,912,941 A | 4/1990 | Buchi |
| 6,251,179 B1 | 6/2001 | Allan |
| 6,668,554 B1 | 12/2003 | Brown |
| 6,672,371 B1 | 1/2004 | Amerman et al. |
| 7,067,004 B2 | 6/2006 | Matula et al. |
| 7,452,417 B2 | 11/2008 | Matula et al. |
| 8,272,437 B2 | 9/2012 | Bour et al. |
| 8,584,753 B2 | 11/2013 | Fitzpatrick et al. |
| 8,616,000 B2 | 12/2013 | Parrella |
| 8,640,772 B2 | 2/2014 | Bour et al. |
| 9,091,460 B2 | 7/2015 | Parrella, Sr. |
| 9,149,439 B2 | 10/2015 | Patel et al. |
| 9,376,885 B2 | 6/2016 | Bour et al. |
| 9,845,423 B2 | 12/2017 | Frantz et al. |
| 9,896,619 B2 | 2/2018 | Nguyen et al. |
| 10,113,106 B2 | 10/2018 | Wadekar |
| 10,927,604 B2 | 2/2021 | Danko |
| 10,954,924 B2 | 3/2021 | Moncarz et al. |
| 11,085,671 B2 | 8/2021 | Gheysens |
| 11,125,471 B2 | 9/2021 | Marsh et al. |
| 11,220,882 B2 | 1/2022 | Nevison et al. |
| 11,299,970 B2 | 4/2022 | Cook |
| 11,656,002 B2 | 5/2023 | Nevison et al. |
| 12,123,406 B2 | 10/2024 | Arefi |
| 12,228,111 B2 | 2/2025 | Arefi |
| 2003/0187583 A1 | 10/2003 | Martin et al. |
| 2006/0081155 A1 | 4/2006 | Chatterji et al. |
| 2006/0210631 A1 | 9/2006 | Patel et al. |
| 2007/0125274 A1 | 6/2007 | Miller |
| 2007/0163805 A1 | 7/2007 | Trevisani |
| 2007/0235192 A1 | 10/2007 | Michaux et al. |
| 2008/0223041 A1 | 9/2008 | Reynolds |
| 2009/0211757 A1 | 8/2009 | Riley |
| 2010/0269501 A1 | 10/2010 | Parrella |
| 2010/0276115 A1 | 11/2010 | Parrella et al. |
| 2011/0232858 A1 | 9/2011 | Hara |
| 2012/0247766 A1 | 10/2012 | Hemmings |
| 2015/0322760 A1 | 11/2015 | Badri et al. |
| 2017/0058181 A1* | 3/2017 | Frantz ................... F24T 10/10 |
| 2020/0191444 A1 | 6/2020 | Nevison et al. |
| 2021/0071063 A1 | 3/2021 | Stone |
| 2021/0348804 A1 | 11/2021 | Marsh et al. |
| 2021/0356174 A1 | 11/2021 | Alharbi et al. |
| 2021/0396430 A1 | 12/2021 | Cook et al. |
| 2024/0228868 A1 | 7/2024 | Werries et al. |
| 2024/0271831 A1 | 8/2024 | Arefi |
| 2024/0337254 A1 | 10/2024 | Arefi |
| 2024/0353051 A1 | 10/2024 | Ring et al. |
| 2024/0368996 A1 | 11/2024 | Arefi |
| 2025/0032974 A1 | 1/2025 | Arefi |

FOREIGN PATENT DOCUMENTS

| | | |
|---|---|---|
| CN | 110386780 A | 10/2019 |
| CN | 110863800 A | 3/2020 |
| JP | 2015120621 A | 7/2015 |
| KR | 101912467 B1 * | 10/2018 |
| WO | 2014092940 A1 | 6/2014 |
| WO | 2015159188 A2 | 10/2015 |
| WO | 2022018674 A1 | 1/2022 |
| WO | 2023034425 A1 | 3/2023 |
| WO | 2023069703 A1 | 4/2023 |
| WO | 2023150452 A1 | 8/2023 |
| WO | 2023150466 A1 | 8/2023 |
| WO | 2024044251 A1 | 2/2024 |

OTHER PUBLICATIONS

PCT International Search Report and Written Opinion of the International Searching Authority dated May 19, 2023.
PCT Notification of Transmittal of International Preliminary Report on Patentability dated May 21, 2024.
U.S. Appl. No. 63/239,250.
Notice of Reasons for Refusal for JP Application No. 2024-546055 dated Feb. 25, 2025, 7 pages (English Machine Translation).
Lee C et al.; "Performance evaluation of closed-loop vertical ground heat exchangers by conducting in-situ thermal response tests" Renewable Energy 42 (2012) 77-83.
Examination Report No. 1 for AU Application No. 2023214420 dated: Sep. 19, 2024, 8 pages.

* cited by examiner

FIG. 1

FIG. 2 ion. It is
HIGH THERMAL COEFFICIENT GROUT COMPOSITIONS AND METHODS THEREFOR

This application claims priority to US provisional patent application with the Ser. No. 63/305,599, which was filed Feb. 1, 2022, and which is incorporated by reference herein.

FIELD OF THE INVENTION

The field of the invention is compositions and methods for heat transfer in geologic heat recovery, and particularly as it relates to compositions with high thermal conductivity that can be deployed/installed in a wellbore at ultra-high temperatures.

BACKGROUND OF THE INVENTION

The background description includes information that may be useful in understanding the present invention. It is not an admission that any of the information provided herein is prior art or relevant to the presently claimed invention, or that any publication specifically or implicitly referenced is prior art.

All publications and patent applications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

Geothermal wells have been used to provide heating and cooling systems that transfer heat to and from the ground. In a typical vertical closed well loop system, two pipes joined by a U-shaped connector at the bottom, forming a continuous casing, are placed vertically in a wellbore drilled in a subterranean formation (see U.S. Pat. App. Pub. No. 2012/0247766). This type of system is generally used for heating and cooling residential and commercial buildings. Here, conventional grout mixtures are clay-based and pumped into a wellbore to fill the annular space between the casing and the formation. The resulting grout forms a seal to prevent contamination of the subsurface from above ground, as well as preventing groundwater contamination. The grout mixture may further include thermally conductive materials to aid in transferring heat between the working fluid in the casing and the target location, and a working fluid may be circulated through the well loop to transfer heat to and from a heat exchanger at the surface.

While these conventional geothermal wells are effective for providing heating and cooling to a location proximate to the well (e.g., heat exchangers) through heat transfer, these wells do not provide enough heat energy to generate electricity using a turbine-based power generation system. To obtain the heat energy necessary for power generation, the well must be significantly deeper beneath the surface and/or in proximity to a known geothermic hot zone (e.g., tectonic plate boundaries). However, all or almost all of the grout compositions formed from conventional grout mixtures are neither capable of efficiently transferring the increased heat energy nor capable of remaining workable during installation at the extreme temperatures (e.g., 300° F. geostatic temperature of the target location) near a target location (e.g., geothermal energy source). Among other issues, the high temperatures at a target location will lead in most cases to premature setting of the grout composition and typically fail to provide sufficiently high thermal conductivity to render power generation effective or even feasible.

While certain clay-based grout mixtures including salt-containing inhibitors and conductive materials are known (see e.g., U.S. Pat. No. 9,845,423), these inhibitors are generally used to delay swelling of an aqueous swellable clay. Such and other formulations may further comprise carbon-based additives to increase thermal conductivity (see e.g., U.S. Pat. No. 7,452,417) However, such formulations do not provide sufficient workability of the grout mixture during installation into the wellbore, let alone during installation at extreme temperatures (e.g., 300° F.).

In further known examples, grout compositions comprising reactive silica, a calcium source, and a carbon additive are provided to so form a thermally conductive material for a geothermal heat pump system as is described in U.S. Pat. App. No. 2012/0247766. Similarly, thermally conductive material can be included in a cementitious material as is described in U.S. Pat. App. No. 2007/012S274. Unfortunately, such compositions are once more unsuitable for placement in a high-temperature formation that has a formation temperature sufficient for power generation as such temperatures will result in premature setting of the composition as so prevent proper placement at a target location in the formation. In addition, and especially where the grout composition must have a high thermal conductivity, addition of thermal conductive materials may render the composition less or even non-pumpable.

Thus, even though various compositions for geothermal grouts are known in the art, all or almost all of them suffer from several drawbacks. Therefore, there remains a need for compositions and methods for a pumpable high-thermal conductivity grout that can be deployed into a formation having a temperature suitable for power generation.

SUMMARY OF THE INVENTION

The inventive subject matter is directed to various compositions for a high-thermal conductivity grout and methods of producing a pumpable slurry forming such high-thermal conductivity grout. The high-thermal conductivity grout is formed from a grout mixture that may be utilized for grouting applications in heat harvesting wells, and especially closed loop geothermal system wells for geothermic power production. The high-thermal conductivity grout advantageously provides improved heat transfer on a per unit length basis in the wells. This improved heat transfer results in greater thermal energy capture into a working fluid, thereby increasing revenue generation for power generating wells.

In one aspect of the inventive subject matter, the grout mixture of the high-thermal conductivity grout composition includes a cementitious material, a retarder, and a high-thermal k material. In some embodiments, the workability of the grout composition is improved from the use of a retarder that allows for the placement of the grout in the wells, even under extreme temperature conditions (e.g., at least 300° F. geostatic temperature of the target location). Without being bound by theory, the inventors for example contemplate that the retarder is present in an amount effective that delays setting of the grout mixture at a target location having a target temperature of at least 300° F. for at least two hours. Further, without being bound by theory, the inventors also contemplate that the high-thermal k material is present in an amount effective such that the grout mixture has, upon setting at a target location, a thermal conductivity of at least 1 W/m° K.

In various embodiments, the grout mixture includes high thermal k materials like graphite, silicon carbide, etc. with, in some cases, conventional cementitious materials such as Portland cement, calcium aluminate cement, etc. The grout mixture has preferably a large volume fraction of solid high thermal k material to provide a high thermal k (high thermal conductivity constant) of the resulting grout in the wells. To this end, the inventors further contemplate that having a high thermal k grout outside of a casing string significantly enhances the thermal efficiency of the well.

In another aspect of the inventive subject matter, the geothermal wells are formed within a formation including a plurality of fissures that are at least partially filled with a high-thermal k material (which may or may not be the same as described above). The high-thermal k material in the fissures is in thermal exchange with the high-thermal conductivity grout. The high-thermal k material in the fissures may be selected from the group consisting of graphite powder, flaked graphite, pyrolytic graphite, desulfurized petroleum coke, graphene, fly ash, copper powder, aluminum nitride, silicon carbide, and combinations thereof. The at least partially filled fissures enhance the surface area from which heat energy can be harvested thereby provide greater heat to working fluid within the well.

Various objects, features, aspects, and advantages of the inventive subject matter will become more apparent from the following detailed description of preferred embodiments, along with the accompanying drawing figures in which like numerals represent like components.

DETAILED DESCRIPTION

The inventors have discovered various high-thermal conductivity grout compositions and methods that can produce a pumpable slurry. Advantageously, the grout composition and slurry will have a constitution that allow deployment to a target location by pumping the slurry to the target location, even where the target location is at considerable depth and where the temperature at the target location is above 300° F. (geostatic temperature of the target location). Viewed from a different perspective, setting of the slurry at the target location will be delayed for a time sufficient for the slurry to reach the target location even at significant depth and very high temperatures. Moreover, upon setting at the target location, a high-thermal conductivity grout is formed that enables heat harvesting (e.g., using a closed loop heat harvesting system) for power production in an economic and continuous manner.

In one embodiment, a high-thermal conductivity grout composition will include a grout mixture that includes a cementitious material, a retarder, and a high-thermal k material. In some embodiments, improved workability results from the use of a retarder that allows placement of the grout composition in the wells, even under extreme temperature conditions (e.g., at least 300° F. geostatic temperature of the target location). Therefore, the inventors contemplate that the retarder is present in an amount effective that delays setting of the grout mixture at a target location having a target temperature of at least 300° F., at least 400° F., or at least 500° F., for at least two hours. Furthermore, it is generally preferred that the high-thermal k material is present in the mixture in an amount effective such that the grout mixture has, upon setting (i.e., hardening to at least 80% of final hardness) at a target location, a thermal conductivity of at least 1 W/m° K, at least 4 W/m° K, or at least 10 W/m° K.

The cementitious material may be any cementitious material suitable for use in subterranean operations, including, but not limited to, a hydraulic cement, a non-hydraulic cement, or a combination thereof. Hydraulic cements harden by the process of hydration due to chemical reactions to produce insoluble hydrates (e.g., calcium hydroxide) that occur independent of the cement's water content (e.g., hydraulic cements can harden even under constantly damp conditions). Thus, hydraulic cements are capable of hardening regardless of the water content of a particular subterranean formation. Suitable hydraulic cements may include, but are not limited to, Portland cement, Portland cement blends (e.g., Portland blast-furnace slag cement, expansive cement, and the like), non-Portland hydraulic cement (e.g., super-sulfated cement, calcium aluminate cement, high magnesium-content cement, and the like), or combinations thereof. Suitable non-hydraulic cements may include, but are not limited to, slaked lime, gypsum plaster, lime plaster, and any combination thereof. In certain embodiments, the cementitious material is a hydraulic cement, such as Portland cement or calcium aluminate cement.

The cementitious material may be present in grout mixture of the high-thermal conductivity grout composition in an amount of at least 1 wt. %, 2 wt. %, 3 wt. %, 4 wt. %, 5 wt. %, 6 wt. %, 7 wt. %, 8 wt. %, 9 wt. %, or 10 wt. %, based on a total weight of the grout mixture. Alternatively, the cementitious material may be present in grout mixture in an amount of no greater than 20 wt. %, 19 wt. %, 18 wt. %, 17 wt. %, 16 wt. %, 15 wt. %, 14 wt. %, 13 wt. %, 12 wt. %, 11 wt. %, or 10 wt. %, based on a total weight of the grout mixture. Alternatively, the cementitious material may be present in grout mixture in an amount of from about 1 to about 20 wt. %, from about 5 wt. % to about 15 wt. %, or from about 7 wt. % to about 13 wt. %, based on a total weight of the grout mixture.

The retarder may be any compound capable of delaying setting of the grout mixture of the high-thermal conductivity grout composition at a target location for at least two hours, at least three hours, at least four hours, at least five hours, at least six hours, or at least seven hours. The target location may have a target temperature (geostatic temperature of the target location) of at least 300° F., at least 350° F., at least 400° F., at least 450° F., at least 500° F., at least 550° F., at least 600° F., at least 650° F., or at least 700° F.

For example, suitable retarders for use in contemplated grout mixtures may include, but are not limited to, a salt including a cation and an anion, a polymer, a silicate, a partially hydrolyzed polyvinyl acetate, a polyacrylamide, a partially hydrolyzed polyacrylamide, a polyalkylene glycol (e.g., polybutylene glycol, polyethylene glycol, polypropylene glycol, and the like), a polyalkylene alcohol, a polyalkylene alkoxylate, a polyalkylene oligomer, a polyalkylene polymer, a polyalkylene copolymer, a cationic oligomer or polymer, an acid, a potassium salt (e.g., potassium fluoride, potassium chloride, potassium chlorate, potassium bromide, potassium iodide, potassium iodate, potassium acetate, potassium citrate, potassium formate, potassium nitrate, dibasic potassium phosphate, monobasic potassium phosphate, potassium sulfate, potassium bisulfate, potassium carbonate, potassium dichromate, potassium ferrate, etc), an ammonium salt, a sodium salt, an iron salt, an aluminum salt, a phosphonium salt, polyaminopolyamide-epichlorohydrin resin, diallydimethylammonium chloride, polydiallyldimethylammonium chloride, aminoethylethanolamine, diethylenetriamine, triethylenetetramine, diethanolamine, triethanolamine, polyvinyl pyrrolidone, potassium silicate, potassium carbonate, tribasic potassium phosphate, or combinations thereof.

In some embodiments, the salt including a cation and an anionic may be such that the cation includes, but is not limited to, at least one of lithium, potassium, sodium, hydronium, ammonium, calcium, magnesium, a quaternary amine, magnesium, calcium, strontium, barium, titanium, cesium, vanadium, chromium, manganese, iron, cobalt, nickel, copper, zinc, aluminum, zirconium, and any combination thereof; and the anion includes, but is not limited to at least one of chloride, bromide, nitrate, iodide, hydroxide, nitrite, hexafluoroantimonate, hexafluoroarsenate, hexafluorophosphate, propionate, lactate, tartrate, phosphate, phosphonium, borate, silicate, sulfate, acetate, aluminate, chromate, dichromate, permanganate, chlorate and perchlorate, formate, or combinations thereof.

In other embodiments, the retarder may include a cationic oligomer or polymer. Suitable such cationic oligomers or polymers may comprise at least one monomer including, but not limited to, imine, alkylene imine, ethylene imine, propylene imine, amine, ethylene amine, an organo-amine, a quaternary amine, acrylamide, methacrylamide, putresine, cadaverine, spermidine, spermine, diethylenetriamine, tetramethylenediamine, triethylenetetramine, tetraethylenepentamine, diallyldimethylammonium chloride, (2-methacryloyloxyethyl)trimethyl ammonium chloride, vinyl pyrrolidone, any derivative thereof, any salt thereof, or combinations thereof.

Suitable silicates for use as the retarder of the present disclosure may be of any type suitable for said use including silicate salts, oligomeric silicates, polymeric silicates, and the like. Examples of suitable silicates may include, but are not limited to, an alkali earth metal silicate, an alkaline earth metal silicate, and any combination thereof, such as sodium silicate, calcium silicate, potassium silicate, sodium metasilicate, calcium metasilicate, potassium metasilicate, and the like.

Depending on the type of retarder used, it should be appreciated that the retarder may be present in the grout mixture of the high-thermal conductivity grout composition in an amount of at least 1 wt. %, 2 wt. %, 3 wt. %, 4 wt. %, 5 wt. %, 6 wt. %, 7 wt. %, 8 wt. %, 9 wt. %, or 10 wt. %, based on a total weight of the grout mixture. Alternatively, the retarder may be present in grout mixture in an amount of no greater than 20 wt. %, 19 wt. %, 18 wt. %, 17 wt. %, 16 wt. %, 15 wt. %, 14 wt. %, 13 wt. %, 12 wt. %, 11 wt. %, or 10 wt. %, based on a total weight of the grout mixture. Alternatively, the retarder may be present in grout mixture in an amount of from about 1 to about 20 wt. %, from about 5 wt. % to about 15 wt. %, or from about 7 wt. % to about 13 wt. %, based on a total weight of the grout mixture. Viewed from a different perspective, the retarder will preferably have a composition and will be present in an amount sufficient that delays setting of the grout composition into a grout by at least two hours, or at least 3 hours, or at least 4 hours, or at least 5 hours (and even more) at a target temperature of (geostatic temperature of the target location) at least 300° F., at least 350° F., at least 400° F., at least 450° F., at least 500° F., at least 550° F., at least 600° F., at least 650° F., and even higher.

As will be readily appreciated, the high-thermal k material is used to improve heat conductivity of the high-thermal conductivity grout formed from the grout mixture, and thus the ability of the geothermal well loop to extract heat during operation. Suitable high-thermal k material may include, but are not limited to, graphite, sand, quartz silica, carbon nanotubes, graphene, boron nitride, brass, a brass alloy, chrome nickel steel, carbon steel, stainless steel, a transition metal (e.g., copper, cadmium, cobalt, gold, silver, iridium, iron, molybdenum, nickel, platinum, zinc, and the like), a transition metal alloy (e.g., a copper alloy, a cadmium alloy, a cobalt alloy, a gold alloy, a silver alloy, an iridium alloy, an iron alloy, a molybdenum alloy, a nickel alloy, a platinum alloy, a zinc alloy, and the like), a post-transition metal (e.g., lead, tin, and the like), a post-transition metal alloy (e.g., an lead alloy, a tin alloy, and the like), an alkaline earth metal alloy (e.g., a beryllium alloy, a magnesium alloy, and the like), or combinations thereof. In certain embodiments, the high-thermal k material will be a carbonaceous material such as graphite powder, exfoliated graphite, flaked graphite, pyrolytic graphite, desulfurized petroleum coke, graphene, fly ash, copper powder, aluminum nitride, silicon carbide, and combinations thereof.

In some embodiments, the high-thermal k material may be present in the grout mixture of the high-thermal conductivity grout composition in an amount sufficient to provide a desired amount of thermal conductivity to the high-thermal conductivity grout of the geothermal well. Therefore, and depending on the particular type of material, the high-thermal k material may be present in grout mixture in an amount of at least 1 wt. %, 2 wt. %, 3 wt. %, 4 wt. %, 5 wt. %, 6 wt. %, 7 wt. %, 8 wt. %, 9 wt. %, or 10 wt. %, or 15 wt. %, or 20 wt. %, or 25 wt. %, or 30 wt. %, or 35 wt. %, and even higher, based on a total weight of the grout mixture. Alternatively, the high-thermal k material may be present in grout mixture in an amount of no greater than 60 wt. %, 50 wt. %, 45 wt. %, 40 wt. %, 35 wt. %, 20 wt. %, 15 wt. %, 13 wt. %, 12 wt. %, 11 wt. %, or 10 wt. %, based on a total weight of the grout mixture. Alternatively, the high-thermal k material may be present in grout mixture in an amount of from about 1 to about 20 wt. %, from about 5 wt. % to about 15 wt. %, or from about 7 wt. % to about 13 wt. %, based on a total weight of the grout mixture.

Therefore, in some embodiments, the high-thermal conductivity grout formed from the grout mixture of the high-thermal conductivity grout composition including the high-thermal k material has a thermal conductivity of at least 0.5 British Thermal Unit per foot per hour per Fahrenheit degree (BTU/hr·ft·° F.), at least 0.578 BTU/hr·ft·° F. (1 W/m° K), at least 1.0 BTU/hr·ft·° F., at least 2.0 BTU/hr·ft·° F., at least 2.312 BTU/hr·ft·° F. (4 W/m° K), at least 3.0 BTU/hr·ft·° F., at least 5.0 BTU/hr·ft·° F., at least 5.782 BTU/hr·ft·° F. (10 W/m° K), at least 7 BTU/hr·ft·° F., at least 10 BTU/hr·ft·° F., at least 14 BTU/hr·ft·° F., at least 16 BTU/hr·ft·° F., or at least 20 BTU/hr·ft·° F., and even higher. Alternatively, the high-thermal conductivity grout formed from the grout mixture including the high-thermal k material has a thermal conductivity in an amount of no greater than 30 BTU/hr·ft·° F., no greater than 25 BTU/hr·ft·° F., no greater than 20 BTU/hr·ft·° F., no greater than 18 BTU/hr·ft·° F., no greater than 16 BTU/hr·ft·° F., no greater than 14 BTU/hr. ft·° F., no greater than 12 BTU/hr·ft·° F., or no greater than 10 BTU/hr·ft·° F.

The grout mixture of the high-thermal conductivity grout composition may further include at least one functional agent. The functional agent may be used to modify the rheological properties of the grout mixture in response to a variety of stimuli, such as temperature, pressure, contact with another material, or combinations thereof. Therefore, suitable functional agents may include a plasticizer, a surfactant, an organic polymer, a silica filler, a clay, and combinations thereof.

In some embodiments, the plasticizer may be present in the grout mixture of the high-thermal conductivity grout composition to improve workability for ease of placement. In various embodiments, the term "plasticizer" refers to a material that increases the fluidity of the grout mixture and thereby increases the workability of the grout mixture or permits the grout mixture to be made with a smaller amount of water while maintaining equal workability. Suitable plasticizers may include, but are not limited to, polycarboxylic ether plasticizers, phthalate plasticizers, terephthalate plasticizers, sulfonamide plasticizers, benzoate plasticizers, phosphate plasticizers, or combinations thereof.

In some embodiments, and depending on the type of plasticizer, the plasticizer may be present in the grout mixture of the high-thermal conductivity grout composition in an amount sufficient to provide the desired amount of workability to the grout mixture. For example, the plasticizer may be present in the grout mixture in an amount of at least 1 wt. %, 2 wt. %, 3 wt. %, 4 wt. %, 5 wt. %, 6 wt. %, 7 wt. %, 8 wt. %, 9 wt. %, or 10 wt. %, based on a total weight of the grout mixture. Alternatively, the plasticizer may be present in grout mixture in an amount of no greater than 20 wt. %, 19 wt. %, 18 wt. %, 17 wt. %, 16 wt. %, 15 wt. %, 14 wt. %, 13 wt. %, 12 wt. %, 11 wt. %, or 10 wt. %, based on a total weight of the grout mixture. Alternatively, the plasticizer may be present in grout mixture in an amount of from about 1 to about 20 wt. %, from about 5 wt. % to about 15 wt. %, or from about 7 wt. % to about 13 wt. %, based on a total weight of the grout mixture.

In further embodiments, a surfactant may be present in the grout mixture of the high-thermal conductivity grout composition to improve the wetting properties of the grout mixture. Therefore, contemplated surfactants may include, but are not limited to, a non-ionic surfactant, an anionic surfactant, a cationic surfactant, a zwitterionic surfactant, or combinations thereof.

Suitable non-ionic surfactants may include, but are not limited to, an alkyoxylate (e.g., an alkoxylated nonylphenol condensate, such as poly(oxy-1,2-ethanediyl), alpha-(4-nonylphenyl)-omega-hydroxy-branched), an alkylphenol, an ethoxylated alkyl amine, an ethoxylated oleate, a tall oil, an ethoxylated fatty acid, an alkyl polyglycoside, a sorbitan ester, a methyl glucoside ester, an amine ethoxylate, a diamine ethoxylate, a polyglycerol ester, an alkyl ethoxylate, an alcohol that has been polypropoxylated and/or polyethoxylated, a linear alcohol alkoxylate, dodecylbenzene sulfonic acid salt derivative, a linear nonyl-phenol, dioxane, ethylene oxide, polyethylene glycol, an ethoxylated castor oil, polyoxyethylene nonyl phenyl ether, tetraethyleneglycoldodecylether, ethylene oxide, decylamine oxide, dodecylamine oxide, an alkylamine oxide, an ethoxylated amide, an alkoxylated fatty acid, an alkoxylated alcohol (e.g., lauryl alcohol ethoxylate, ethoxylated nonyl phenol), an ethoxylated fatty amine, an ethoxylated alkyl amine (e.g., cocoalkylamine ethoxylate), any derivative thereof, and any combination thereof. As used herein, the term "derivative," refers to any compound that is made from one of the identified compounds, for example, by replacing one atom in the listed compound with another atom or group of atoms or rearranging two or more atoms in the listed compound.

Suitable anionic surfactants may include, but are not limited to, methyl ester sulfonate, a hydrolyzed keratin, polyoxyethylene sorbitan monopalmitate, polyoxyethylene sorbitan monostearate, polyoxyethylene sorbitan monooleate, an alkyl ether sulfate, sodium 4-(1'heptylnonyl) benzenesulfonate, sodium dioctyl sulphosuccinate, sodium octlylbenzenesulfonate, sodium hexadecyl sulfate, sodium laureth sulfate, a quaternary ammonium compound (e.g., a trimethylcocoammonium chloride, a trimethyltallowammonium chloride, a dimethyldicocoammonium chloride, and the like), a cetylpyridinium chloride, an alkyl ester sulfonate, an alkyl ether sulfonate, an alkyl ether sulfate, an alkali metal alkyl sulfate, an alkyl sulfonate, an alkylaryl sulfonate, a sulfosuccinate, an alkyl disulfonate, an alkylaryl disulfonate, an alkyl disulfate, an alcohol polypropoxylated sulfate, an alcohol polyethoxylated sulfateany derivative thereof, or any combination thereof.

Suitable zwitterionic surfactants may include, but are not limited to, an alkyl amine oxide, an alkyl betaine, an alkyl arnidopropyl betaine, an alkyl sulfobetaine, an alkyl sultaine, a dihydroxyl alkyl glycinate, an alkyl ampho acetate, a phospholipid, an alkyl aminopropionic acid, an alkyl imino monopropionic acid, an alkyl imino dipropionic acid, dipalmitoyl-phosphatidylcholine, an amine oxide, a betaine, a modified betaine, an alkylamidobetaine (e.g., cocoamidopropyl betaine), and any combination thereof.

Moreover, surfactants that may exhibit viscoelastic properties may include, but are not limited to, a sulfosuccinate, a taurate, an amine oxide (e.g., an amidoamine oxide), an ethoxylated amide, an alkoxylated fatty acid, an alkoxylated alcohol, an ethoxylated fatty amine, an ethoxylated alkyl amine, a betaine, modified betaine, an alkylamidobetaine, a quaternary ammonium compound, an alkyl sulfate, an alkyl ether sulfate, an alkyl sulfonate, an ethoxylated ester, an ethoxylated glycoside ester, an alcohol ether, any derivative thereof, and any combination thereof.

In general, a surfactant may be present in the grout mixture of the high-thermal conductivity grout composition in an amount sufficient to provide a desired amount of surface tension to the grout mixture. Therefore, the surfactant may be present in the grout mixture in an amount of at least 1 wt. %, 2 wt. %, 3 wt. %, 4 wt. %, 5 wt. %, 6 wt. %, 7 wt. %, 8 wt. %, 9 wt. %, or 10 wt. %, based on a total weight of the grout mixture. Alternatively, the surfactant may be present in grout mixture in an amount of no greater than 20 wt. %, 19 wt. %, 18 wt. %, 17 wt. %, 16 wt. %, 15 wt. %, 14 wt. %, 13 wt. %, 12 wt. %, 11 wt. %, or 10 wt. %, based on a total weight of the grout mixture. Alternatively, the surfactant may be present in grout mixture in an amount of from about 1 to about 20 wt. %, from about 5 wt. % to about 15 wt. %, or from about 7 wt. % to about 13 wt. %, based on a total weight of the grout mixture.

The organic polymer may be present in the grout mixture of the high-thermal conductivity grout composition to improve various properties (e.g., to control rheological parameters, or supper heat of hydration) of the grout mixture. Therefore, suitable organic polymers may include, but are not limited to, natural compounds, synthetic compounds, or a combination thereof. Non-limiting examples of suitable natural compounds include polysaccharides, such as polysaccharides and polysaccharide ethers which are soluble in cold water, such as cellulose ethers, starch ethers (amylose and/or amylopectin and/or derivatives thereof), guar ethers, dextrins, or combinations thereof. Non-limiting examples of suitable synthetic compounds include protective colloids, for example one or more polyvinylpyrrolidones and/or polyvinylacetals, polyvinyl alcohols, melamine formaldehyde sulfonates, naphthalene formaldehyde sulfonates, block copolymers of propylene oxide and ethylene oxide, styrene-maleic acid and/or vinyl ether-maleic acid copolymers.

In some embodiments, the organic polymer may be present in the grout mixture of the high-thermal conductivity grout composition in an amount sufficient to provide the desired amount of properties to the grout mixture. The organic polymer may be present in grout mixture in an amount of at least 1 wt. %, 2 wt. %, 3 wt. %, 4 wt. %, 5 wt. %, 6 wt. %, 7 wt. %, 8 wt. %, 9 wt. %, or 10 wt. %, based on a total weight of the grout mixture. Alternatively, the organic polymer may be present in grout mixture in an amount of no greater than 20 wt. %, 19 wt. %, 18 wt. %, 17 wt. %, 16 wt. %, 15 wt. %, 14 wt. %, 13 wt. %, 12 wt. %, 11 wt. %, or 10 wt. %, based on a total weight of the grout mixture. Alternatively, the organic polymer may be present in grout mixture in an amount of from about 1 to about 20 wt. %, from about 5 wt. % to about 15 wt. %, or from about 7 wt. % to about 13 wt. %, based on a total weight of the grout mixture.

The clay may be present in the grout mixture of the high-thermal conductivity grout composition to modify flowability of the grout mixture. Suitable clay may include a member of the smectite family, a member of the palygorskite-sepiolite phyllosilicate family, a member of the kaolinite-serpentine family, nontronite, bentonite, hectorite, attapulaite, fluoromica, montmorillonite, beidellite, saponite, sepiolite, kaolinite, illite, any cation exchanged version thereof, or combinations thereof.

Of the suitable smectite family clays including nontronite, montmorillonite, saponite, hectorite, and beidellite, other suitable smectite family clays for use as the aqueous swellable clays of the present disclosure may include, but are not limited to, aliettite, ferrosaponite, sauconite, stevensite, swinefordite, volkonskoite, yakhontovite, and any combination thereof. Suitable members of the palygorskite-sepiolite pyhyllosilicate family may include, but are not limited to, attapulgite, tuperssautsiaite, windhoekite, yofortierite, falcondoite, ferrisepiolite, loughlinite, and any combination thereof. Suitable members of the kaolinite-serpentine family of aqueous swellable clays may include, but are not limited to, kaolinite, greenalite, fraipontite, halloysite, dickite, lizardite, manandonite, nacrite, cronstedtite, clinochrysotile, chrysotile, nepouite, odinite, webskyite, pecoraite, orthochrysotile, parachrysotile, caryopilite, brindleyite, berthierine, amesite, antigorite, baumite, and any combination thereof.

In some embodiments, the clay may be present in the grout mixture of the high-thermal conductivity grout composition in an amount sufficient to provide the desired amount of properties to the grout mixture. The clay may be present in grout mixture in an amount of at least 1 wt. %, 2 wt. %, 3 wt. %, 4 wt. %, 5 wt. %, 6 wt. %, 7 wt. %, 8 wt. %, 9 wt. %, or 10 wt. %, based on a total weight of the grout mixture. Alternatively, the clay may be present in grout mixture in an amount of no greater than 20 wt. %, 19 wt. %, 18 wt. %, 17 wt. %, 16 wt. %, 15 wt. %, 14 wt. %, 13 wt. %, 12 wt. %, 11 wt. %, or 10 wt. %, based on a total weight of the grout mixture. Alternatively, the clay may be present in grout mixture in an amount of from about 1 to about 20 wt. %, from about 5 wt. % to about 15 wt. %, or from about 7 wt. % to about 13 wt. %, based on a total weight of the grout mixture.

The grout mixture of the high-thermal conductivity grout composition may also include a variety of additives, such as a thermally insulative material, a dispersant, an aggregate, or combinations thereof. The additives may modify the thermodynamic properties of the grout mixture or the resulting high-thermal conductivity grout, or further modify the rheological properties of the grout mixture. Other additives may include sodium chloride to improve mixability, viscoelastic surfactants and/or polymers to offset thermal thinning and suspension of solids after placement, fluid loss additives, and accelerators, such as calcium chloride.

The thermally insulative material may be present in the grout mixture of the high-thermal conductivity grout composition to modify the thermal conductivity of the resulting high-thermal conductivity grout, which may counteract the effects of a portion of the high-thermal k material. The thermally insulative material may also be desirable in portions of the geothermal well near the surface to minimize heat transfer outside the well. Suitable thermally insulative materials may be solid particles that have low thermal conductivity. Specific examples of suitable thermally insulative materials for use in the grout mixture may include, but are not limited to, glass (e.g., glass spheres), diatomaceous earth, polyurethane, polyurethane foam, polystyrene, perlite, fiberglass, cork, wood, straw, rock wool, mineral wool, cellulose, and any combination thereof.

In some embodiments, the thermally insulative material may be present in the grout mixture of the high-thermal conductivity grout composition in an amount sufficient to provide the desired amount of thermal insulation to the grout mixture. The thermally insulative material may be present in grout mixture in an amount of at least 1 wt. %, 2 wt. %, 3 wt. %, 4 wt. %, 5 wt. %, 6 wt. %, 7 wt. %, 8 wt. %, 9 wt. %, or 10 wt. %, based on a total weight of the grout mixture. Alternatively, the thermally insulative material may be present in grout mixture in an amount of no greater than 20 wt. %, 19 wt. %, 18 wt. %, 17 wt. %, 16 wt. %, 15 wt. %, 14 wt. %, 13 wt. %, 12 wt. %, 11 wt. %, or 10 wt. %, based on a total weight of the grout mixture. Alternatively, the thermally insulative material may be present in grout mixture in an amount of from about 1 to about 20 wt. %, from about 5 wt. % to about 15 wt. %, or from about 7 wt. % to about 13 wt. %, based on a total weight of the grout mixture.

A dispersant may be present in the grout mixture of the high-thermal conductivity grout composition as a thinner or deflocculant for increasing the setting time of the resulting high-thermal conductivity grout by, without being bound by theory, reducing the viscosity of the final grout fluid. In some embodiments, the dispersant may include, but is not limited to, derivatives of an acid, salts of derivatives of an acid, phosphates, sodium carbonates, polymeric or monomeric sodium silicate complexes (e.g., sodium metasilicate, water glass, and the like), lignite compounds, and low molecular weight polymers, soaps, surfactants, sulfonates, or combinations thereof.

The derivatives of an acid that may be used as dispersants in the grout mixture may include, but are not limited to, derivatives of tannic acid, derivatives of citric acid (e.g., citrate), derivatives of humic acid, derivatives of phosphoric acid, disodium hydrogen phosphate, trisodium phosphate, dihydrogen phosphate, quebracho, derivatives of quebracho, sulfornethylated quebracho, derivatives of sulfomethylated quebracho, alkylated quebracho, derivatives of alkylated quebracho, a naphthalene sulfonic acid condensed with formaldehyde, and any combination thereof. Salts of these derivatives of an acid may also be suitable as a dispersant (e.g., a sodium salt of a derivative of an acid), including, but not limited to, sodium humate, sodium phosphate, sodium citrate, sodium tannate, and the like, and any combination thereof. Suitable phosphates for use as the dispersant in the grout additive control packages described herein may include, but are not limited to, sodium polyphosphate, tetrasodium polyphosphate, sodium tripolyphosphate, sodium hexametaphosphate, sodium acid pyrophosphate, sodium metaphosphate, sodium hexametaphosphate, and any combination thereof. Suitable lignite compounds may include, but are not limited to, lignosulfonates, lignosulfonate alkali salts (e.g., sodium, potassium, or alkaline earth metals, such as calcium, and the like), lignosolfonates of acrylic acid, causticized lignites, causticized leonardites, ferro lignosulfonates, chrome lignosulfonates, ferro-chrome lignosulfonates, transition metal lignosulfonates (e.g., zirconium lignosulfonates, titanium lignosulfonates, and the like), sulfoalkylated lignites, or combinations thereof.

Examples of suitable low molecular-weight polymers may include, but are not limited to, polyacrylates, alkaline salts of polyacrylic acid, poly(sulfonated styrene-co-maleic anhydride), poly(acrylic acid-co-vinyl sulfonic acid), alkaline salts of polymethacrylate, polyacrylamide 2-acrylamido-2-methylpropane sulfonic acid, sodium salts of polyacrylamide 2-acrylamido-2-methylpropane sulfonic acid, polymers produced from condensed naphthalene sulfonic acid sulfonated polymers, polymers of unsaturated dicarboxylic acids, polymers of monoethylenically unsaturated monocarboxylic acids, graft polymers of ethylenically unsaturated monomers and polyalkylene glycols, polymers allyloxybenzenesulfonates, polymeric alkylated salts of allyloxybenzenesulfonates, terpolymers of tetrahydrophthalic acid, acrylic acid and 2-acrylamido-2-methylpropane sulfonic acid and lignosulfonates, graft copolymers of tetrahydrophthalic acid, acrylic acid and 2-acrylamido-2-methylpropane sulfonic acid and lignosulfonates, polymeric organosilicons, and As used herein, the term "low molecular weight polymer" means a polymer with a molecular weight of less than 1,000,000.

Suitable soaps that may be used as the dispersants may include, but are not limited to, odium stereate, potassium stereate, ammonium stereate, sodium aurate, potassium aurate, sodium myristate, potassium myristate, sodium ricinoleate, potassium ricinoleate, sodium palmitate, potassium palmitate, calcium caprylate, sodium caprylate, potassium caprylate, 4,7,10,13,16,19-docosahexaenoic acid, 4,7,10,13,16-docosapentaenoic acid, 5,8,11,14,17-cicosapentaenoic acid, 5,8,11,14-cicosatetraenoic acid, 5,8,11-cicosatrienoic acid, 6,9,12,15-octadecatetraenoic acid, 7,10,13,16,19-docosapentaenoic acid, 7,10,13,16-docosatetraenoic acid, 8,11,14,17-cicosatetraenoic acid, 8,11,14-eicosatrienoic acid, behenic acid, capric acid, caprylic acid, cis-11-docosenoic acid, cis-11-cicosenoic acid, cis-11-octadecenoic acid, cis-15-tetracosenoic acid, cis-4-decenoic acid, cis-4-dodecenoic acid, cis-4-tetradecenoic acid, cis-5-lauroleic acid, cis-5-tetradecenoic acid, cis-6-octadecenoic acid, cis-9-decenoic acid, cis-9-dodecenoic acid, cis-9-cicosenoic acid, cis-9-hexadecenoic acid, cis-9-tetradecenoic, cis-tetracosenoic acid, caprylic acid decenoic acid, dihydroxystearic acid, docosadienoic acid, docosahexaenoic acid, docosapentaenoic acid, dotriacontanoic acid, cicosadienoic acid, eicosanoic acid, eicosapentaenoic acid, cicosatetraenoic acid, eicosatrienoic acid, cicosenoic acid, erucic acid, heptadecanoic acid, heptadecenoic acid, hexacosanoic acid, hexadecadienoic acid, hexadecenoic acid, lauric acid, linoleic acid, linolenic, myristic acid, nonadecanoic acid, nonanoic acid, octacosanoic acid, octadecatetraenoic acid, octadecatrienoic acid, oleic acid, palmitic acid, pentadecanoic acid, pentadecenoic acid, pentatriacontanoic acid, ricinoleic acid, stearic acid, tetracosanoic acid, tetradecenoic acid, tetratriacontanoic acid, triacontanoic acid, tridecanoic acid, tritriacontanoic acid, or combinations thereof.

Suitable sulfonates for use as the dispersant according may include, but are not limited to, a melamine sulfonate condensed with formaldehyde, a sulfonated styrene maleic anhydride copolymer, a sulfonated vinyl toluene maleic anhydride copolymer, a sodium naphthalene sulfonate condensed with formaldehyde, a sulfonated acetone condensed with formaldehyde, an interpolymer of acrylic acid, an allyloxybenzene sulfonate, an allyl sulfonate, or combinations thereof.

In some embodiments, the dispersant may be present in the grout mixture of the high-thermal conductivity grout composition in an amount sufficient to provide the desired amount of setting time to the grout mixture. The dispersant may be present in grout mixture in an amount of at least 1 wt. %, 2 wt. %, 3 wt. %, 4 wt. %, 5 wt. %, 6 wt. %, 7 wt. %, 8 wt. %, 9 wt. %, or 10 wt. %, based on a total weight of the grout mixture. Alternatively, the dispersant may be present in grout mixture in an amount of no greater than 20 wt. %, 19 wt. %, 18 wt. %, 17 wt. %, 16 wt. %, 15 wt. %, 14 wt. %, 13 wt. %, 12 wt. %, 11 wt. %, or 10 wt. %, based on a total weight of the grout mixture. Alternatively, the dispersant may be present in grout mixture in an amount of from about 1 to about 20 wt. %, from about 5 wt. % to about 15 wt. %, or from about 7 wt. % to about 13 wt. %, based on a total weight of the grout mixture.

An aggregate may be present in the grout mixture of the high-thermal conductivity grout composition as a filler. A non-limiting example of a suitable aggregate includes sand. The sand may have an average particle size of between 0.1 mm and 2.0 mm. The sand may be present in grout mixture in an amount of at least 1 wt. %, 2 wt. %, 3 wt. %, 4 wt. %, 5 wt. %, 6 wt. %, 7 wt. %, 8 wt. %, 9 wt. %, or 10 wt. %, based on a total weight of the grout mixture. Alternatively, the sand may be present in grout mixture in an amount of no greater than 20 wt. %, 19 wt. %, 18 wt. %, 17 wt. %, 16 wt. %, 15 wt. %, 14 wt. %, 13 wt. %, 12 wt. %, 11 wt. %, or 10 wt. %, based on a total weight of the grout mixture. Alternatively, the sand may be present in grout mixture in an amount of from about 1 to about 20 wt. %, from about 5 wt. % to about 15 wt. %, or from about 7 wt. % to about 13 wt. %, based on a total weight of the grout mixture.

A method of producing a pumpable slurry is also provided. The method includes combining the high-thermal conductivity grout composition with a quantity of water. The method further includes mixing the water with the high-thermal conductivity grout composition to thereby form the pumpable slurry. Any method or process of mixing may be utilized including a static mixer, a rotary mixer, or a re-circulation jet mixer. The grout mixture of the high-thermal conductivity grout composition has upon addition of water a viscosity that allows pumping the grout mixture to the target location having the target temperature.

In various embodiments, the quantity of water is sufficient to generate a slurry density of between about 10 and about 20 lbs/gal, between about 12 and about 18 lbs/gal, or between about 14 and about 16 lbs/gal. Alternatively, the quantity of water is sufficient to generate a slurry density of at least 10 lbs/gal, at least 12 lbs/gal, at least 14 lbs/gal, at least 16 lbs/gal, or at least 18 lbs/gal. Alternatively, the quantity of water is sufficient to generate a slurry density of no greater than 20 lbs/gal, no greater than 18 lbs/gal, no greater than 16 lbs/gal, no greater than 14 lbs/gal, or no greater than 12 lbs/gal.

The pumpable slurry may include water in a weight ratio of water to the cementitious material of from about 0.01:1 to about 1:1, from about 0.2:1 to about 1:1, from about 0.3:1 to about 0.8:1, or from about 0.4:1 to about 0.6:1. Alternatively, the pumpable slurry may include water in a weight ratio of water to the cementitious material of at least 0.01:1, at least 0.2:1, at least 0.3:1, or at least 0.4:1. Alternatively, the pumpable slurry may include water in a weight ratio of water to the cementitious material of no greater than 1:1, no greater than 0.8:1, or no greater than 0.6:1.

The pumpable slurry may have a water content of 1 and 50 gal/sk., 1 and 40 gal/sk., 5 and 30 gal/sk., or 10 and 20 gal/sk. Alternatively, the pumpable slurry may have a water content of at least 1 gal/sk., at least 5 gal/sk., or at least 10 gal/sk. Alternatively, the pumpable slurry may have a water content of no greater than 50 gal/sk., no greater than 40 gal/sk., or no greater than 30 gal/sk.

As will be readily appreciated, the high-thermal conductivity grout compositions presented herein can be formulated to meet the specific local demands at the target location for the placement of the grout in the annular space between the well bore and the casing. Among other parameters, it is contemplated that temperature and pressure at the target location can be simulated above ground and the composition adjusted to achieve a specific flowability and time to set at the target location. Therefore, during the final design of any formulation, additional retarder may necessitate addition and/or adjustment of other additives to control settling of solids in the slurry prior to setting as can be readily performed by the skilled artisan.

Figure 1:
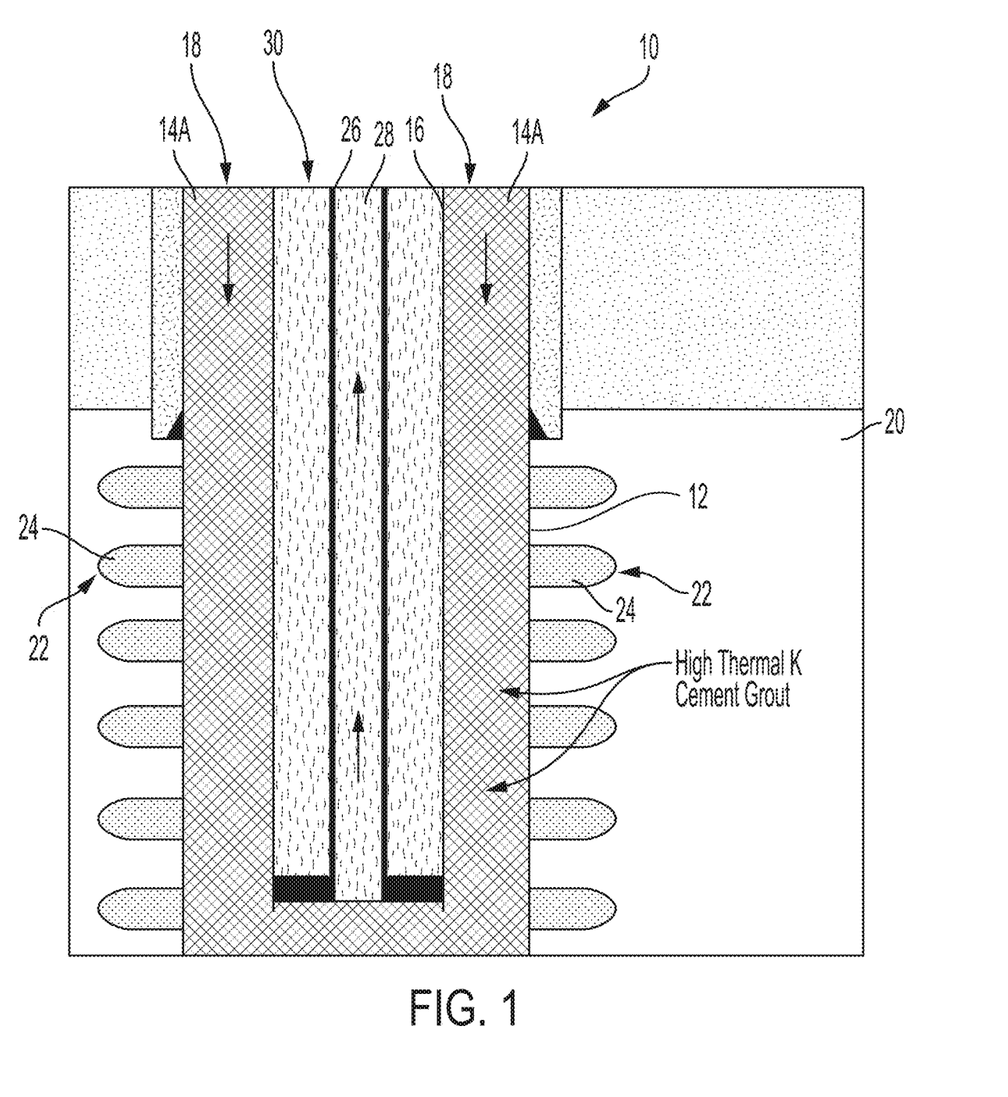
FIG. 1 is a schematic view illustrating an embodiment of a geothermal well including a wellbore during placement of a pumpable slurry.
Figure 2:
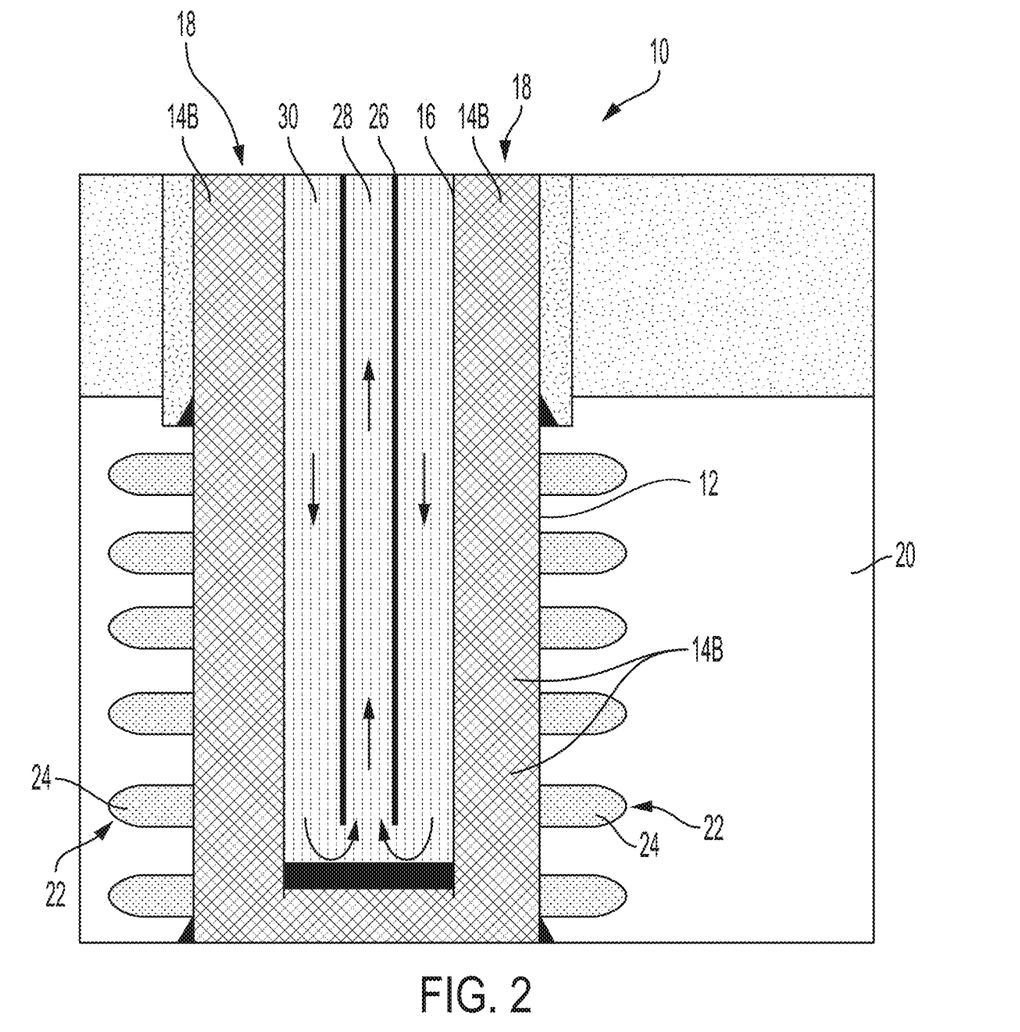
FIG. 2 is a schematic view illustrating an embodiment of the geothermal well of FIG. 1 after setting of the pumpable slurry.

FIG. 1 and FIG. 2 are schematic views illustrating embodiments of a geothermal well 10 including a wellbore 12 during placement of a pumpable slurry 14A (FIG. 1) and after setting of the pumpable slurry 14B (FIG. 2). The geothermal well 10 further includes a casing 16 located in the wellbore 12 such that an annular space 18 is formed therebetween. The pumpable slurry 14A/14B is located in the annular space of the wellbore 12. Upon setting, the pumpable slurry 14A forms a high-thermal conductivity grout 14B. The casing 16 is most typically part of a structure that forms a continuous circuit for a circulating working fluid therein and may therefore have a tube-in-tube configuration (as exemplarily shown in FIGS. 1 and 2). However, other configurations, which may or may not include heat exchangers and/or heat exchange fins, are also deemed suitable for use herein. The geothermal well 10 will be formed within formation 20. In various embodiments, formation 20 includes a plurality of fissures 22 that are at least partially filled with a high-thermal k material 24. The high-thermal k material 24 in the fissures 22 is in thermal exchange (and may chemically bond with) with the high-thermal conductivity grout 14B in the wellbore 12. As will be readily appreciated, the high-thermal k material 24 in the fissures 22 may be the same material as the high-thermal conductivity grout 14A/B, however, high-thermal k material 24 may also be distinct. The high-thermal k material 24 in the fissures 22 is preferably a cementitious material and will include a thermally conductive materials such as graphite powder, flaked graphite, pyrolytic graphite, desulfurized petroleum coke, graphene, fly ash, copper powder, aluminum nitride, silicon carbide, and combinations thereof. As such, the high-thermal k material 24 may be identical or similar to the high-thermal conductivity grout composition presented herein. However, and as noted above, it should be appreciated that the high-thermal k material 24 need not contain a cementitious component.

In some embodiments, the pumpable slurry 14A is routed through the annular space 18 of the wellbore 12, and the pumpable slurry 14A will contact the high-thermal k material 24 in fissures 22. In further embodiments, the pumpable slurry 14A is routed through the annular space 18 of the wellbore 12, and the pumpable slurry 14A will also fill the fissures 22 and so form the high-thermal k material 24 in the fissures. In yet further embodiments, it is preferred (but not necessary) that placing the grout composition is performed in a reverse circulation as indicated in FIG. 1 (and as is, for example, described in PROCEEDINGS, Thirty-Fifth Workshop on Geothermal Reservoir Engineering, Stanford University, Stanford, California, Feb. 1-3, 2010, incorporated by reference herein). In such example, slurry 14A will be fed through the annular space to the target location (typically the terminal portion of the well bore), and at least some of the slurry will exit the target location upwards through the inner return conduit 26 (typically through a valve or other fluid control structure such as a stinger and flapper valve, not shown). It should be appreciated that the inner return conduit 26 forms a fluid path 28 for the hot working fluid once the power generation system is in operation, and that the space between the casing 16 and the inner return conduit 26 forms fluid path 30 that conveys the working fluid to the target location. In that context it should be noted that the fluid path 30 can also be used to 'flush out' residual slurry in the inner return conduit 26 as is shown in FIG. 2. As will be readily appreciated, the direction of the working fluid from fluid path 30 to 28 can be done through a valve or other fluid control structure (not shown).

Once the installation of the closed loop conduit (formed in part by casing 16 and inner conduit 26) and grout is completed, the working fluid in the fluid path 30 will be in direct contact with the casing, which is in turn thermally coupled to the surrounding formation 20 via the hardened high-thermal conductivity grout composition 14B and high-thermal k material 24 in the fissures. Therefore, it should be noted that where the wellbore contains fissures that are at least partially filled with high-thermal k material, heat harvest is enabled across a continuous and thermally conductive path that distally extends from the well bore into the formation, and from the formation into the working fluid via the hardened high-thermal conductivity grout composition.

In view of the foregoing, the inventors therefore contemplate various methods of installing the high-thermal conductivity grout 14B in the wellbore 12. The method includes pumping the pumpable slurry 14A to a target location within the wellbore 12 having a target temperature of (geostatic temperature of the target location) at least 300° F., at least 350° F., at least 400° F., at least 450° F., or at least 500° F. The target location may be below ground at least 500 feet, at least 600 feet, at least 700 feet, at least 800 feet, at least 900 feet, at least 1,000 feet, at least 1,250 feet, at least 1,500 feet, at least 1,750 feet, at least 2,000, at least 2,500 feet, or at least 3,000 feet. As will be readily appreciated, conventional grout compositions would not be suitable for such operation as these compositions would harden well in advance of reaching the target location due to the severe temperature conditions and time required for the slurry to reach the target location. Most typically, the target location is a dry and hot rock formation that will in most cases have low or no significant permeability (e.g., intrusive igneous or metamorphous rock).

In various embodiments, the target location extends in a substantially vertical orientation. The term "substantially" as utilized herein means that the target location extends toward the center of the earth but may be offset from the center by no greater than 15 degrees, no greater than 10 degrees, no greater than 5 degrees, or no greater than 1 degree. It is to be appreciated that the geothermal well 10 may have multiple target locations and thus may have both substantially vertical orientated target locations and target locations extending in orientations that are at least 30 degrees.

The method further includes allowing the pumpable slurry 14A to set in the annular space 18 to thereby form the high-thermal conductivity grout 14B in the wellbore 12. The high-thermal conductivity grout 14B is in thermal exchange with the casing 16 and the formation 20 surrounding the wellbore 12. Most typically, the time to set for the pumpable slurry 14A is at least two hours, at least three hours, or at least four hours, at a formation temperature of (geostatic temperature of the target location) at least 300° F., at least 350° F., at least 400° F., at least 450° F., or at least 500° F.

In various embodiments, the pumpable slurry 14A is fed to a pump (not shown) that pumps the pumpable slurry 14A into the wellbore 12. In certain embodiments, the step of combining the high-thermal conductivity grout composition with water and the step of pumping the pumpable slurry 14A are separated by at least four hours, at least five hours, or at least six hours. In further embodiments, routing the pumpable slurry 14A into the annular space 18 between the wellbore 12 and the casing 16 displaces a fluid in the annular space 18.

As noted above and with continuing reference to FIGS. 1-2, in certain embodiments, a secondary conduit 26 defining a return space 28 is located within the casing 16. Therefore, a second annular space 30 is formed between the casing 16 and the secondary conduit 26. In these and other embodiments, displacing the fluid in annular space 18 includes removing the fluid through the return space 28 using a secondary fluid that moves from the second annular space 30 to the return space 28.

With particular reference to FIG. 2, during operation of the geothermal well 10, working fluid can move into the closed loop system through the second annular space 30 and return to the surface through the return space 28. However, it is to be appreciated that the flow of working fluid may also be reversed. As the working fluid moves through the second annular space 30, geothermal energy from the formation is conducted via high-thermal k material 24 in the fissures 22 and the high-thermal conductivity grout 14B to casing 16 in which the working fluid travels in annular space 30 downwards, thereby increasing the temperature of the working fluid. The so heated working fluid then moves through the return space 28 toward the surface. A heat exchanger and turbine generator (both not shown) may be located proximate to the geothermal well 10 that is capable of utilizing the temperature of the working fluid to generate electrical energy.

Tables 1-4 describe exemplary high-thermal conductivity grout compositions suitable for use herein (here: % bwoc=Percent by weight of cement; and % bwow=Percent by weight of water). However, it should be appreciated that these compositions are merely provided to illustrate certain aspects of the inventive subject matter and are not intended to limit the scope of the inventive subject matter. For example, while the below formulations use Portland cement, it should be appreciated that calcium aluminate cement systems (e.g., ThermaLock™ Cement from Halliburton and Thermal Shock Resistant Cement (TSRC) from Brookhaven National Lab) are also expressly contemplated, especially where temperatures at the target locations are relatively high (e.g., above 400° C.).

TABLE 1

(Formulation with graphite, 13.5 lb/gal)

| Material | Amount |
|---|---|
| Lehigh Class H Cement | 94. lbs |
| 200 Mesh Silica | 40% bwoc |
| TIMREX M100 | 15% bwoc |
| TIMREX 50x80 | 60% bwoc |
| TIMREX PP44 | 22.35% bwoc |
| CD121 (Dispersant) | 1.5% bwoc |
| CR020 (Retarder) | 2.0% bwoc |
| CE155 (Retarder) | 0.8% bwoc |
| NaCl (3% bwow) | 3.0% bwow |
|  | 1.47% bwoc |
| Total Graphite | 97.35% bwoc |
| Density (lb/gal) | 13.5 |
| Water (gal/sk) | 16.54 |
| Yield (ft³/sk) | 3.61 |
| Volume Fraction: |  |
| Cement & Silica | 19.7% |
| Graphite | 18.0% |
| Water | 62.3% |

TABLE 2

(Formulation with graphite and silicon carbide, 14.0 lb/gal)

| Material | Amount |
|---|---|
| Texas Lehigh Cement | 94 lbs |
| 200 Mesh Silica | 40% bwoc |
| RiLock W325 | 45% bwoc |
| (325 grit Silicon Carbide) |  |
| Graphite (Asbury P894M) | 75% bwoc |
| Ritek Dispersant | 0.25% bwoc |
| RiLock S20 (s.g. 1.07) | 0.3% bwow |
| Mix Water | 17.0 gal/sk |
| CR020 (Retarder) | 3.0% bwoc |
| CE155 (Retarder) | 0.9% bwoc |
| Density | 14.0 lb/gal |
| Yield | 3.68 cu. ft./sk |
| Volume Fraction |  |
| Cement & Silica | 19% |
| Graphite | 13.4% |
| Silicon Carbide | 5.8% |
| Water | 61.8% |

TABLE 3

(Formulation with graphite and silicon carbide, 15.3 lb/gal)

| Material | Amount |
|---|---|
| Texas Lehigh Cement | 94 lbs |
| 200 Mesh Silica | 40% bwoc |
| RiLock W325 | 40% bwoc |
| (325 grit Silicon Carbide) |  |
| RiLock W180 | 25% bwoc |
| (180 grit Silicon Carbide) |  |
| RiLock W90 | 10% bwoc |
| (90 grit Silicon Carbide) |  |
| Graphite (Asbury P894M) | 65% bwoc |
| Ritek Dispersant | 1% bwoc |
| CR020 (Retarder) | 3.4% bwoc |
| CE155 (Retarder) | 1.1% bwoc |
| RiLock S20 (s.g. 1.07) | 0.45% bwow |
| NaCl | 3% bwow |
|  | (3.37 lb/sk) |

TABLE 3-continued (Formulation with graphite and silicon carbide, 15.3 lb/gal)

| Material | Amount |
| --- | --- |
| Mix Water | 13.5 gal/sk |
| Density | 15.3 lb/gal |
| Yield | 3.32 ft³/sk |
| Volume Fraction | |
| Cement & Silica | 21.3% |
| Graphite | 13.0% |
| Silicon Carbide | 10.8% |
| Water | 54.9% |

TABLE 4

(Formulation with graphite and silicon carbide, 20.0 lb/gal)

| Material | Amount |
| --- | --- |
| Texas Lehigh Cement | 94 lbs |
| 200 Mesh Silica | 40% bwoc |
| RiLock W180 (180 grit Silicon Carbide) | 25% bwoc |
| RiLock W90 (90 grit Silicon Carbide) | 25% bwoc |
| RiLock W54 (54 grit Silicon Carbide) | 50% bwoc |
| RiLock W24 (24 grit Silicon Carbide) | 50% bwoc |
| Ritek Dispersant | 1.5% bwoc |
| RiLock S20 (s.g. 1.07) | 0.45% bwow |
| CR020 (Retarder) | 4.1% bwoc |
| CE155 (Retarder) | 1.9% bwoc |
| Mix Water | 5.2 gal/sk |
| Density | 20.0 lb/gal |
| Yield | 2.12 ft³/sk |
| Volume Fraction | |
| Cement & Silica | 19.4% |
| Silicon Carbide | 19.5% |
| Water | 61.1% |

In some embodiments, the numbers expressing quantities of ingredients, properties such as concentration, reaction conditions, and so forth, used to describe and claim certain embodiments of the invention are to be understood as being modified in some instances by the term "about." As used herein, the terms "about" and "approximately", when referring to a specified, measurable value (such as a parameter, an amount, a temporal duration, and the like), is meant to encompass the specified value and variations of and from the specified value, such as variations of +/−10% or less, alternatively +/−5% or less, alternatively +/−1% or less, alternatively +/−0.1% or less of and from the specified value, insofar as such variations are appropriate to perform in the disclosed embodiments. Thus, the value to which the modifier "about" or "approximately" refers is itself also specifically disclosed. The recitation of ranges of values herein is merely intended to serve as a shorthand method of referring individually to each separate value falling within the range. Unless otherwise indicated herein, each individual value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise. As also used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification or claims refer to at least one of something selected from the group consisting of A, B, C . . . and N, the text should be interpreted as requiring only one element from the group, not A plus N, or B plus N, etc.

What is claimed is:

1. A high-thermal conductivity grout composition for heat transfer from a hot rock formation into a working fluid of a geothermal heat harvesting system for electrical or thermal energy generation, comprising:
   a grout mixture comprising a cementitious material, a retarder, and a high-thermal k material;
   wherein the retarder is present in an amount effective that delays setting of the grout mixture at a target location having a geostatic target temperature of at least 300° F. for at least two hours; and
   wherein the high-thermal k material is present in an amount effective such that the grout mixture has, upon setting at the target location, a thermal conductivity of at least 10 W/m° K.

2. The composition of claim 1, wherein the grout mixture further comprises at least one functional agent selected from the group consisting of a plasticizer, a surfactant, an organic polymer, a silica filler, and a clay.

3. The composition of claim 1, wherein the cementitious material is a hydraulic or a Portland cement.

4. The composition of claim 1, wherein the grout mixture further comprises sand having an average particle size of between 0.1 mm and 2.0 mm.

5. The composition of claim 1, wherein the retarder is selected from the group consisting of a lignosulphonate, a phosphonate, a sugar, a hydroxycarboxylic acid, a borate, and a salt of Zn, Pb, Cu, Sb, or As.

6. The composition of claim 1, wherein the high-thermal k material is selected from the group consisting of graphite powder, exfoliated graphite, flaked graphite, pyrolytic graphite, desulfurized petroleum coke, graphene, fly ash, copper powder, aluminum nitride, and silicon carbide.

7. The composition of claim 1, wherein the retarder is present in an amount effective that delays setting of the grout mixture at a target location having a geostatic target temperature of at least 400° F. for at least two hours.

8. The composition of claim 1, wherein the grout mixture has upon addition of water a viscosity that allows pumping the grout mixture to the target location having the target temperature.

9. A method of producing a pumpable slurry for heat transfer from a hot rock formation into a working fluid of a geothermal heat harvesting system, comprising:
    combining the high-thermal conductivity grout composition of claim 1 with a quantity of water;
    mixing the water with the high-thermal conductivity grout composition to thereby form the slurry;
    wherein mixing uses a static mixer, a rotary mixer, or a jet mixer; and
    wherein the quantity of water is sufficient to generate a slurry density of between 10 and 20 lb/gal.

10. The method of claim 9, further comprising a step of feeding the pumpable slurry to a pump that pumps the slurry into a wellbore at least four hours after the step of combining the high-thermal conductivity grout with water.

11. A method of installing a high-thermal conductivity grout in a wellbore, wherein a casing is located in the wellbore such that an annular space is formed therebetween, the method comprising:
    combining the high-thermal conductivity grout composition of claim 1 with a quantity of water to thereby form a pumpable slurry;
    pumping the pumpable slurry to a target location within the wellbore having a geostatic target temperature of at least 300° F.;
    allowing the pumpable slurry to set in the annular space to thereby form the high-thermal conductivity grout in the wellbore, wherein the high-thermal conductivity grout is in thermal exchange with the casing and a formation surrounding the wellbore;
    wherein the time to set for the pumpable slurry is at least two hours at a formation temperature of at least 300° F.

12. The method of claim 11, wherein the target location extends in a substantially vertical orientation at least 500 ft below ground.

13. The method of claim 11, wherein the target location extends in an orientation that is at least 30 degrees angled from a substantially vertical orientation.

14. The method of claim 11, wherein the geostatic target temperature at the target location is at least 400° F., and wherein the time to set for the pumpable slurry is at least two hours.

15. The method of claim 11, wherein pumping the pumpable slurry into the annular space between the wellbore and the casing displaces a fluid in the annular space.

16. The method of claim 15, wherein a secondary conduit defining a return space is located within the casing, and wherein a second annular space is formed between the casing and the secondary conduit.

17. The method of claim 16, wherein displacing the fluid includes removing the fluid through the return space using a secondary fluid that moves from the second annular space to the return space.

18. The method of claim 11, wherein the formation surrounding the wellbore includes a plurality of fissures that are at least partially filled with a high-thermal conductivity material, and wherein the high-thermal conductivity material in the fissures is in thermal exchange with the high-thermal conductivity grout in the wellbore.

19. The method of claim 18, wherein the high-thermal conductivity material in the fissures is selected from the group consisting of graphite powder, flaked graphite, pyrolytic graphite, desulfurized petroleum coke, graphene, fly ash, copper powder, aluminum nitride, and silicon carbide.

* * * * *